US006889792B1

(12) United States Patent
Fardoun et al.

(10) Patent No.: US 6,889,792 B1
(45) Date of Patent: May 10, 2005

(54) ELECTRICALLY ASSISTED POWER STEERING SYSTEM WITH ANTI-THEFT CAPABILITY

(75) Inventors: Abbas A. Fardoun, Dearborn, MI (US); Joseph D. Miller, Farmington Hills, MI (US); James C. Loria, Warren, MI (US); Hemant Sardar, Farmington Hills, MI (US)

(73) Assignee: TRW Inc., Cleveland, OH (US)

( * ) Notice: Subject to any disclaimer, the term of this patent is extended or adjusted under 35 U.S.C. 154(b) by 28 days.

(21) Appl. No.: 10/210,137

(22) Filed: Aug. 1, 2002

(51) Int. Cl.[7] ............................................. B60R 25/02
(52) U.S. Cl. ...................................... 180/287; 180/443
(58) Field of Search ................................ 180/287, 443, 180/444, 446; 70/283.1, 252; 307/10.2

(56) References Cited

U.S. PATENT DOCUMENTS

| 3,983,953 A | 10/1976 | Bayle | 180/446 |
|---|---|---|---|
| 4,415,054 A | 11/1983 | Drutchas | 180/444 |
| 4,660,671 A | 4/1987 | Behr et al. | 180/446 |
| 4,794,997 A | 1/1989 | North | 180/446 |
| 5,257,828 A | 11/1993 | Miller et al. | 180/446 |
| 5,504,403 A | 4/1996 | McLaughlin | 318/432 |
| 5,641,032 A * | 6/1997 | Whitman | 180/287 |
| 5,811,887 A * | 9/1998 | Peyre et al. | 307/10.3 |
| 5,869,908 A * | 2/1999 | Moczygemba et al. | 307/10.5 |
| 6,268,790 B1 * | 7/2001 | Cregeur | 340/425.5 |

FOREIGN PATENT DOCUMENTS

EP 0 857 135 5/2002

* cited by examiner

Primary Examiner—Paul N. Dickson
Assistant Examiner—Laura B. Rosenberg
(74) Attorney, Agent, or Firm—MacMillan, Sobanski & Todd LLC

(57) ABSTRACT

An electrically assisted power steering system includes an anti-theft feature. Upon detection of an event that is indicative of a vehicle theft situation, the drive circuit for the electric assist motor is selectively actuated to excite the motor windings to either prevent or oppose movement of the steering system.

18 Claims, 9 Drawing Sheets

ELECTRICALLY ASSISTED POWER STEERING SYSTEM WITH ANTI-THEFT CAPABILITY

BACKGROUND OF THE INVENTION

This invention relates in general to Electrically-assisted Power Steering (EPS) systems for motor vehicles and in particular to an EPS system that also provides vehicle anti-theft protection.

In the past, vehicles have been equipped with Hydraulically-assisted Power Steering (HPS) systems. As is well known in the prior art, conventional HPS systems include a hydraulic actuator that is connected to the vehicle steering linkage. The hydraulic actuator is controlled by a rotary control valve that is connected to the vehicle steering wheel. A pump supplies pressurized hydraulic fluid to the rotary control valve which is operable to supply a portion of the hydraulic fluid to the actuator. When the vehicle operator turns the steering wheel, the rotary control valve is rotated. Rotation of the rotary control valve causes displacement of the hydraulic actuator which, in turn applies a directed force to the steering linkage to assist the vehicle operator in turning the steerable front vehicle wheels. In a HPS system, the pump is continuously driven by a belt from the vehicle engine crankshaft. Accordingly, HPS systems impose a continuous power requirement upon the vehicle engine.

Recently, Electrically-assisted Power Steering (EPS) systems have been developed to replace HPS systems. An EPS systems includes an electric assist motor that, upon actuation, applies torque to the vehicle steering linkage to assist the vehicle operator in turning the front vehicle wheels. Because the electric assist motor is only actuated when the steering wheel is moved, the power requirements for generating the assist torque are intermittent instead of continuous, as with HPS systems. As a result, operating of efficiency of the vehicle is improved. Also, the electrical wiring required by the EPS system may be easier to route within the vehicle engine compartment that the hydraulic lines needed for a conventional HPS system.

Referring now to FIG. 1, there is shown a schematic drawing of a conventional EPS system 10. The system 10 includes a steering wheel 12 connected to an input shaft 14. The input shaft 14 is connected through a steering torque sensor 16 to an output shaft 18. The torque sensor 16 is operative to generate a torque requirement signal that is proportional to the torque applied to the steering wheel 12 by the vehicle operator. The torque sensor includes a torsion bar (not shown) that is connected between the input and output shafts 14 and 18. A position sensor (also not shown) also is connected to the input and output shafts. The position sensor senses the relative rotational position between the input and output shafts 14 and 18. Taking into account the torsional strength of the torsion bar, the sensed relative rotational position is indicative of the amount of steering torque applied to the steering wheel 12. The torque requirement signal is generated when the operator rotates the steering wheel and will decrease as the steerable wheels respond. Additionally, the torque sensor also will generate a torque requirement signal when the steering wheel is held stationary and the steerable wheels move in response to road surface conditions.

The output of the torque sensor 16 is connected to a steering Electronic Control Unit (ECU) 20 that includes a microprocessor (not shown) for controlling the EPS system 10. The microprocessor includes memory capacity, such as internal ROM and/or RAM, for storing an algorithm for controlling the operation of the EPS system 10. A vehicle speed sensor 21 provides a vehicle speed signal to the steering ECU 20.

Also shown in FIG. 1 is a conventional mechanical lock 22 that is mounted upon the steering input shaft 14. The lock 22 is normally actuated to prevent movement of the steering wheel as a vehicle theft deterrent. The lock 22 is electrically connected a body control module 24 that provides overall control functions over various vehicle systems, including the EPS system 10 and an engine control unit 25. The body control module 24 is connected to a key lock 26. In a known manner, insertion and rotation of a key in the key lock 26 causes the body control module 24 to deactuate the mechanical lock 22, allowing rotation of the steering wheel 12.

The steering output shaft 18 is connected to a pinion gear (not shown) of a rack and pinion gear set 30. The rack and pinion gear set 30 functions to transform the rotational motion of the steering wheel 12 into linear motion of a steering rack 32. The steering rack 32 is connected to steerable vehicle wheels 34 in a conventional manner. The linear movement of the steering rack 32 deflects the wheels 34 to the right or left.

The EPS system 10 includes an electric assist motor 36. Typically, the assist motor 36 is operatively connected to the steering rack 32 through a ball nut assembly (not shown) in a conventional manner. Alternately, the assist motor 36 can be coupled to column drive systems, pinion drive systems, or other conventional steering systems. When the electric assist motor 36 is energized, the motor rotor turns, which, in turn, rotates the nut portion of the ball nut assembly. When the nut portion rotates, the balls transfer a linear force to the steering rack 32, thereby providing an assistance torque to aid the driver in turning the wheels 34. The direction of movement of the steering rack 32 is dependent upon the direction of rotation of the electric assist motor 36. A motor rotor position sensor 38 is mounted upon the motor 36 and is connected to the steering ECU 20. One of the functions of the motor rotor position sensor 38 is to provide an electrical signal indicative of the position of the motor rotor relative to the motor stator to the steering ECU 20. For proper operation of the electric assist motor 36, including direction of rotation and applied torque, it is necessary to know the position of the rotor relative to the stator. Optionally, the motor rotor sensor 38 also may provide additional information concerning current flow through the motor 36.

A motor drive circuit 40 is connected to and actuates the electric assist motor 36. Electric power is supplied to the drive circuit 40 through a power supply relay 42 by the vehicle power supply 44. Both the drive circuit 40 and power supply relay 42 are connected to the steering ECU 20 which is operational to control both devices.

A schematic drawing of the motor drive circuit 40 is shown in FIG. 2. Components shown in FIG. 2 that are similar to components shown in FIG. 1 have the same numerical designators. As shown in FIG. 2, the electric assist motor 36 is a multi-phase brushless star connected permanent magnet motor. The motor 36 includes three motor windings that are labeled R, Y and B. Each of the motor windings R, Y and B has a first end and a second end. The first ends of the motor windings are connected to the motor drive circuit 40. Specifically, the first end of each motor winding is connected between a corresponding pair of electronic switches, which are shown as bipolar transistors in FIG. 2 but could be other devices, such as, for example FET's. A first transistor in each pair, labeled $T_{1B}$, $T_{1Y}$ and $T_{1R}$ for the corresponding winding, is connected between each phase winding and the power supply relay 42 while a second transistor in each pair, labeled $T_{2B}$, $T_{2Y}$ and $T_{2R}$ for the corresponding winding, is connected between each winding and ground. The bases of each of the transistors are connected to the steering ECU 20.

The second ends of each of the motor windings R, Y and B are connected to motor winding relay 43. As shown in FIG. 2, the motor winding relay 43 has two sets of contacts each of which separates the second end of one of a pair of the motor windings B and R from the second end of the third winding Y. When the relay contacts are closed, as during normal operation of the motor 36 and motor drive circuit 40, the second ends of all three motor windings are connected to form the star connection. The contacts in the motor winding relay 43 are opened if a fault is detected in the EPS system 10, such as, for example, a shorted motor winding or transistor in the motor drive circuit 40. Opening of the motor winding relay contacts isolates each of the motor windings from the other of the motor windings and from the winding that is common to the relay contacts. This prevents back EMF generated by movement of the steering column (and hence the motor rotor) from finding a low impedance path through the control circuit and thus prevents electrical braking of the steering apparatus.

The microprocessor in the steering ECU 20 controls the amount of steering assist provided by the motor 36 as a function of both the applied steering torque and the vehicle speed. The microprocessor is responsive to signals received from the steering torque sensor 16, the motor rotor position sensor 38 and the vehicle speed sensor 21 to generate steering command signals. The microprocessor can also receive data from other vehicle systems, such as for example, the temperature, that it can utilize in generating the steering command signals. The steering command signals are applied to the transistors in the motor drive circuit 40 to selectively energize the motor phase windings B, Y and R. As a result of energizing the motor phase windings, the motor rotor will rotate in a desired direction to provide an assist torque to the steerable wheels 34. For example, switching transistors $T_{1B}$, $T_{1R}$ and $T_{2Y}$ to their conducting state will cause a current to flow through the motor windings to energize phase Y and to produce a corresponding motor torque. Similarly, switching transistors $T_{1Y}$, $T_{2B}$ $T_{2R}$ to their conducting states will result in an opposite current flowing through the motor windings to energize phase Y in the opposite direction and to produce a counter-torque.

As shown in FIG. 1, the EPS system 10 includes a mechanical lock 22 as an anti-theft device. It would be desirable to utilize the EPS system 10 to provide theft deterrence and thereby eliminate the need for a mechanical anti-theft device. An EPS system that incorporates an ant-theft feature would simplify the steering system by reducing the number of components with a corresponding reduction in cost.

SUMMARY OF THE INVENTION

This invention relates to an EPS system that also provides vehicle anti-theft protection.

The present invention contemplates an electrically assisted power steering system that includes an electric steering assist motor that is adapted to be connected to a vehicle steering system. The system also includes a drive circuit electrically connected to the assist motor, the drive circuit being operative to control the direction of rotation and torque generated by the assist motor. The system further includes a controller electrically connected to the drive circuit, the controller being operative, upon initialization of the system, to cause the drive circuit to control the assist motor in such a manner that movement of the vehicle steering system is inhibited until verification that a vehicle theft situation does not exist.

The assist motor includes a plurality of motor windings that are selectively energized as phases. The drive circuit contains pairs of electronic switches for controlling the current flowing through each of the motor windings with a first electronic switch of each pair connected between the winding and a power supply and a second electronic switch of each pair connected between the winding and ground. Upon system initialization, the controller is operative to cause the drive circuit to short the motor windings by connecting the windings together. The windings are connected together by either the controller causing all of the first electronic switches to be in a conducting state or by the controller causing all of the second electronic switches to be in a conducting state.

Alternately, the controller can be operative to apply a constant current to one of the motor phases. The anti-theft protection can be implemented solely by selective operation of electronic switches that are included in the drive circuit or the electronic switches for implementing the anti-theft protection can be included in the assist motor to implement the protection.

During operation of the electrically assisted power steering system, the motor windings are sequentially energized in accordance with a series of sequential command signals to provide an assist torque to the vehicle steering system. The sequential command signals are generated by the controller for the drive circuit in response to motor rotor position signals and steering torque signals. Rotor position signals are generated either by the controller from monitored motor parameters or received from a rotor position sensor attached to the motor shaft. Accordingly, the invention also contemplates that controller can be operative, upon system initialization, to prevent updating of the motor rotor position signals in order to prevent movement of the vehicle steering system until verification that a vehicle theft situation does not exist.

The present invention also contemplates a method for theft protection of a vehicle that includes the steps of providing an electric power steering system having an assist motor that is adapted to be connected to a vehicle steering system. The electric power steering system also includes a drive circuit electrically connected to the assist motor, the drive circuit being responsive to a steering command signal to control the direction of rotation and torque generated by the assist motor. The electric power steering system further includes a controller electrically connected to the drive circuit, the controller being responsive to steering torque signals to generate steering command signals. The electric power steering system is disabled upon actuation of the vehicle ignition system to inhibit movement of the vehicle steering system. The electric power steering system is returned to operation only upon confirmation that a vehicle theft situation does not actually exist.

The electric assist motor has a plurality of windings that are sequentially actuated to cause the motor rotor to rotate. The invention contemplates that the electric power steering system is disabled by shorting at least one of motor windings, passing a constant current through at least one, or more than one, of the motor windings or blocking updated motor rotor position information which is used to determine a series of steering command signals that are utilized by the motor driver circuit.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
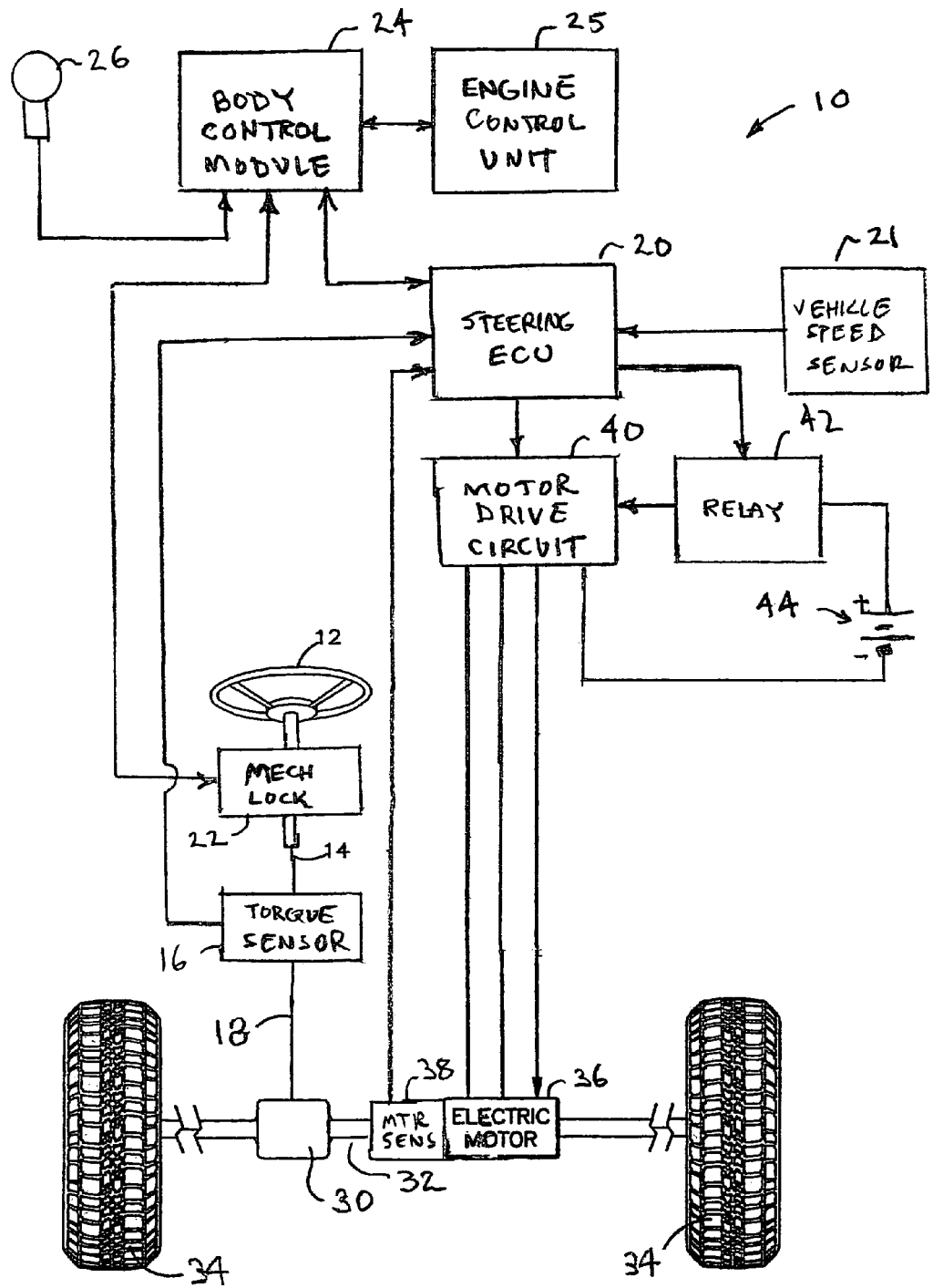
FIG. 1 is a schematic drawing of a known conventional EPS system 10.
Figure 3:
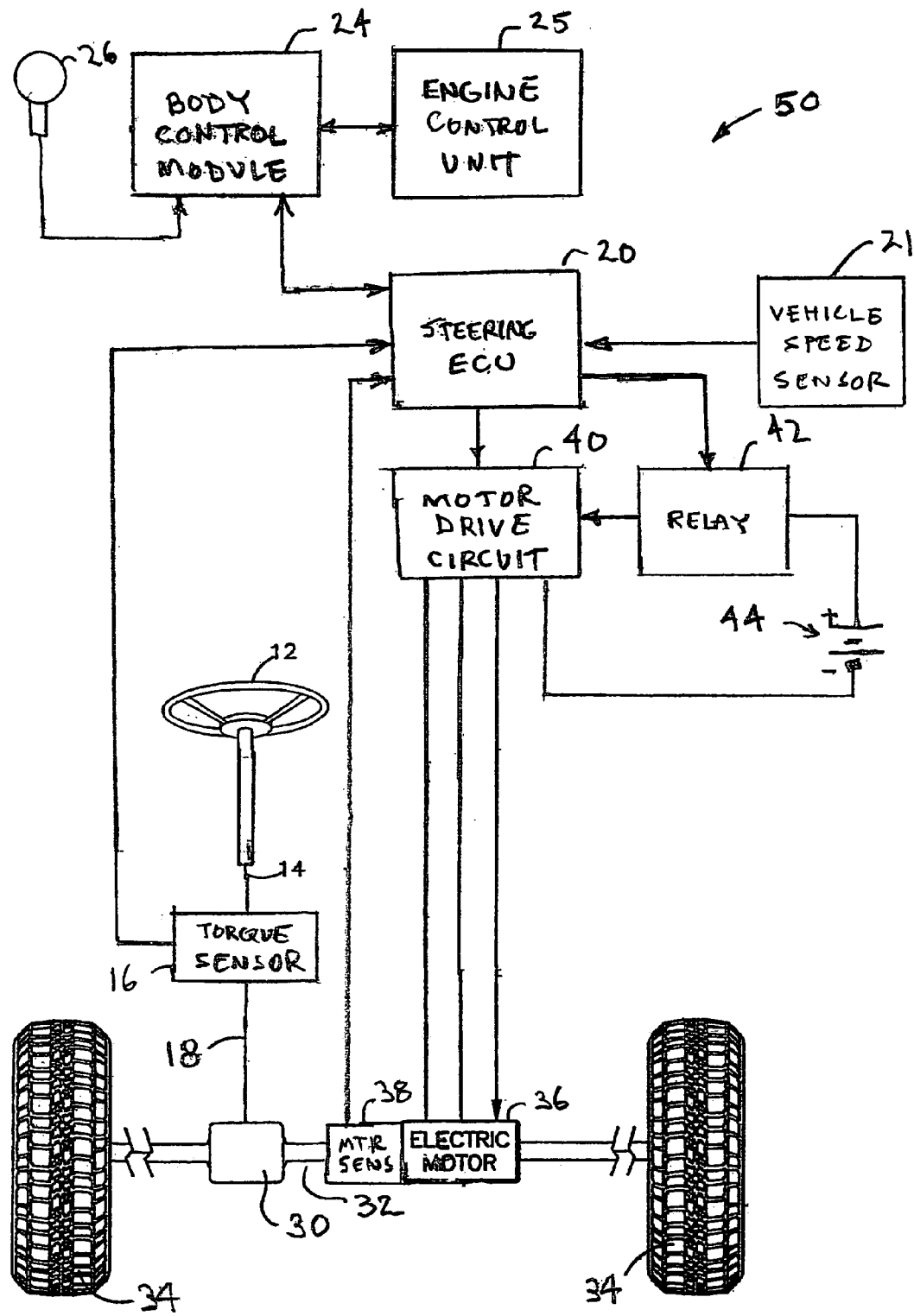
FIG. 3 is a schematic drawing of an EPS system that includes an anti-theft device in accordance with the invention.

Referring now to the drawings, there is illustrated in FIG. 3, an improved EPS system 50 in accordance with the present invention. Components shown in FIG. 3 that are similar to components shown in FIG. 1 have the same numerical designators. The EPS system 50 includes an anti-theft feature and therefore the mechanical lock 22 shown in FIG. 1 has been omitted.

The present invention contemplates a modified algorithm for operation of the microprocessor in the steering ECU 20. The modified algorithm includes an anti-theft feature that utilizes the motor drive circuit 40 and the electric assist motor 36 shown in FIG. 3 to "lock" the front wheels 34 in their current position as a vehicle theft deterrent. The algorithm is illustrated by the flow chart 52 shown in FIG. 4. In functional block 54 the vehicle ignition circuit is energized. This normally occurs when an ignition key is inserted into the vehicle ignition switch key lock; however, the circuit also can be energized when the ignition switch is bypassed during an attempted vehicle theft. In either case, electric power is supplied to both the steering ECU 20 and the body control module 24.

In functional block 56, the EPS system 50 is initialized. During initialization, the microprocessor in the ECU 20 runs a series of self tests to assure that all of the components of the EPS system 50 are functioning properly. If any of the system components fail their self test, an error code is generated and the system 50 is disabled. Additionally, an error message is displayed for the vehicle operator. Upon successful completion of the self tests, the algorithm advances to functional block 58.

In functional block 58, the modified algorithm causes the motor drive circuit 40 to be operated in a manner that will inhibit operation of the vehicle steering system. For the particular embodiment shown in FIG. 4, the motor winding relay 43 is closed and all three of the second electronic switches $T_{2B}$, $T_{2Y}$ and $T_{2R}$ are switched to their conducting states. Alternately, all three of the first electronic switches $T_{1B}$, $T_{1Y}$ and $T_{1R}$ can be switched to their conducting states. As a result, all of the motor windings are shorted. Therefore, whenever one tries to steer the system by turning the steering wheel 12, a back emf is generated in all three windings in the same direction and the assist motor 36 will act as a drag upon the steering rack 32, making the steering wheel 12 extremely difficult to turn.

In the preferred embodiment, the ignition key includes an electronic chip that carries an identification code for the vehicle. When an ignition key is inserted into the ignition switch key lock 26, the key identification code is sent to the body control module 24, as shown in functional block 59. Also, when the body control module 24 is initially energized, a first timer (not shown) begins running. In decision block 60, it is determined if the key identification code is received within a first predetermined time period, $T_1$, after the body control module has been energized. In the preferred embodiment, the first predetermined time period $T_1$ is two seconds; however, it will be appreciated that the invention also can be practiced with another time duration selected for the first time period. If a key identification code is not received with the first predetermined time period $T_1$, it is an indication that a theft may be in progress and the algorithm proceeds to functional block 62 where the steering ECU 20 continues to inhibit operation of the EPS system 50 by maintaining the selected electronic switches in their conducting states. Typically, the body control unit 24 will also send signals to the engine control unit 25 to inhibit starting the vehicle engine. If a key identification code is received by the body control unit 24 within the predetermined time period, the algorithm proceeds to decision block 64.

In decision block 64, the body control module 24 compares the actual ignition key identification code to a key identification code stored within the control module. If the actual key identification code does not match the stored key identification code, the algorithm transfers to function block 62 to continue inhibiting the EPS system 50 by maintaining the selected electronic switches in their conducting states. If the key identification codes do match, it is an indication that the correct key is being used and the body control module 24 transmits a signal to the steering ECU 20 while the algorithm transfers to decision block 66.

Upon initial energization, the EPS ECU 20 starts a second timer. If the ECU 20 does not received the message from the body control module 24 indication that the correct ignition key is being used within a second predetermined time period $T_2$, it is an indication the body control module 24 has been tampered with. Accordingly, in decision block 66, it is determined whether the key identification message is received by the ECU 20 within the second predetermined time period $T_2$, which in the preferred embodiment is $T_1$ plus 100 milliseconds. If the message is not received in decision block 66 within the second time period $T_2$, the algorithm again transfers to functional block 62 to continue inhibiting the EPS system 50 by maintaining the selected electronic switches in their conducting states. If the message is received in decision block 66 within the second predetermined time period $T_2$, the algorithm proceeds to functional block 70 where the EPS system 50 is returned to normal by switching all of the selected electronic switches to their non-conducting states.

Figure 4:
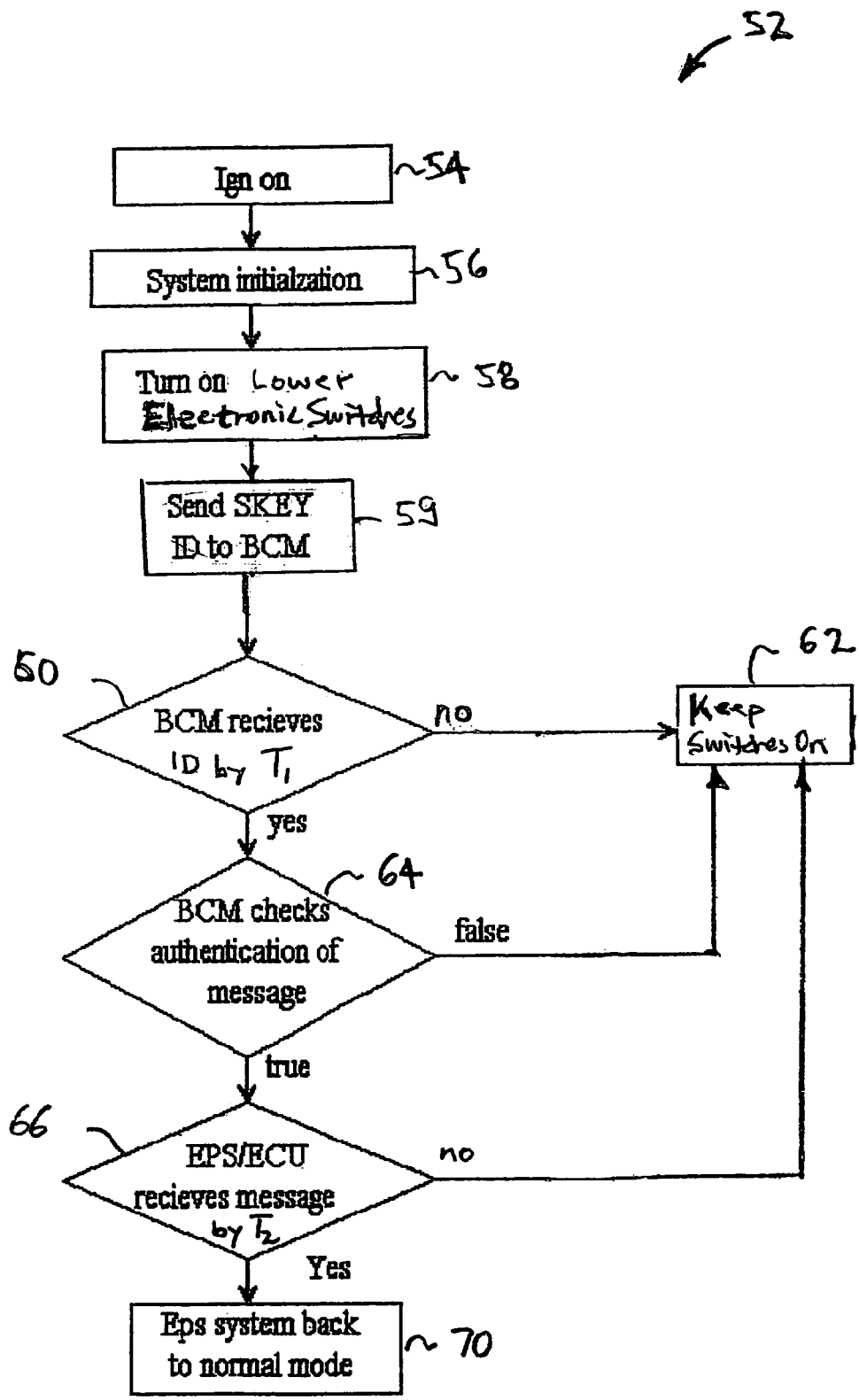
FIG. 4 is a flow chart for operation of the EPS system shown in FIG. 3.
Figure 5:
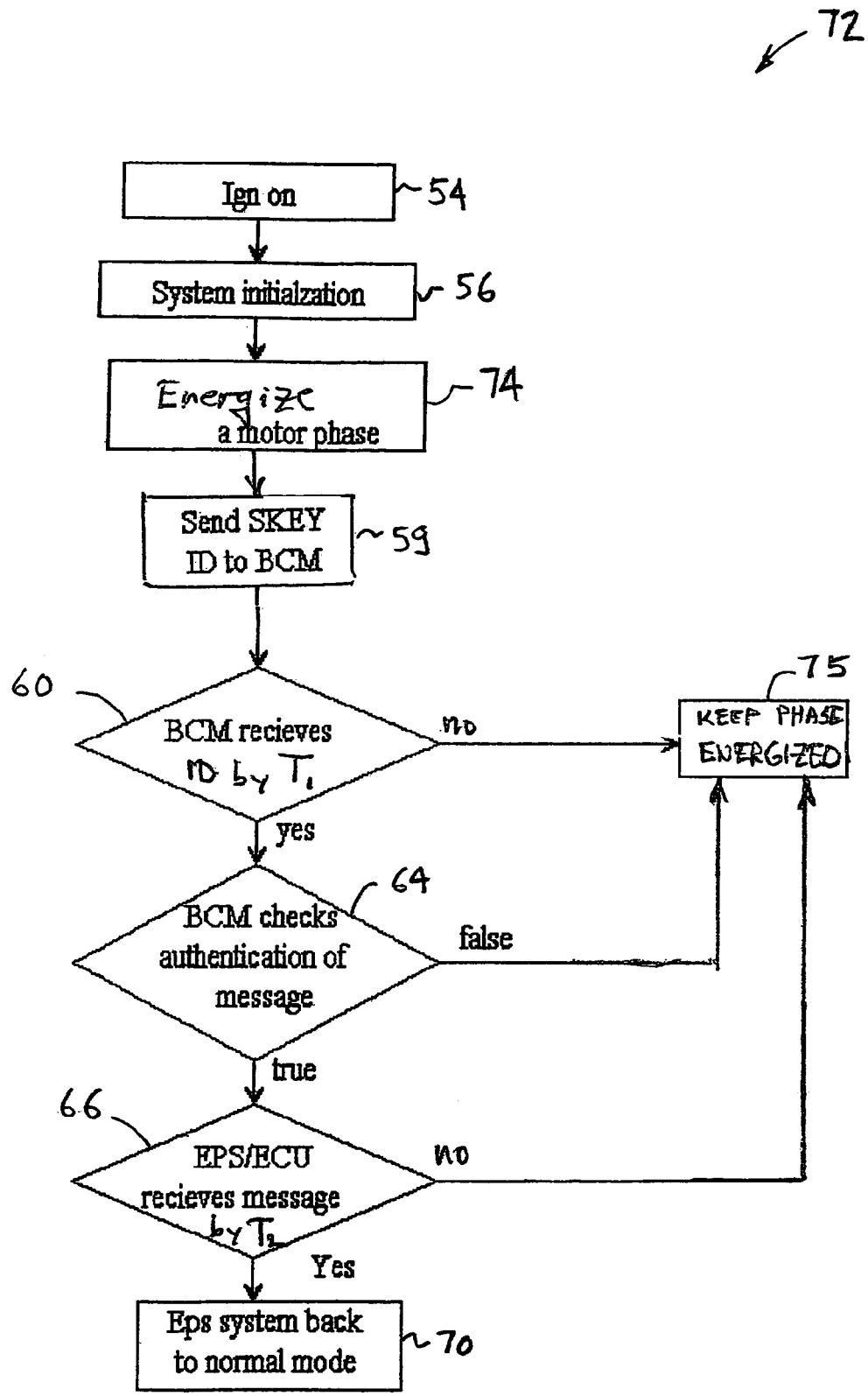
FIG. 5 is a flow chart for an alternate embodiment for operation of the EPS system shown in FIG. 3.

An alternate embodiment of the algorithm is illustrated by the flow chart 72 in FIG. 5. Flow chart blocks shown in FIG. 5 that are the same as blocks in FIG. 4 have the same numerical identifiers. The primary difference between FIGS. 4 and 5 is the method utilized to inhibit the EPS system 50. As shown in functional block 74, the system 50 is inhibited after initialization by energizing a selected one of the motor phases by placing three of the electronic switches into their conducting states. For example, phase B is energized when switches $T_{1Y}$, $T_{1R}$ and $T_{2B}$ are caused to be in their conducting states, allowing a current to flow through the motor windings. Thus, if phase B is energized by a 20 amp current, 10 amps will flow through $T_{1Y}$ and $T_{1R}$ while 20 amps flows through $T_{2B}$. While phase B has been used in the example, it will be appreciated that any one of the three motor phases can be selected. Additionally, the motor winding relay 43 remains closed.

In the preferred embodiment, a current having a sufficient magnitude to generate a counter torque in the motor windings to prevent rotation of the steering wheel 12 is applied to the windings for the selected phase. As a result, the steering column is effectively locked. Should a thief manage to overcome the motor countertorque, the steering wheel 12 would only move in a step function manner as the steering rack 32 moves and there by forces the next motor pole pair into alignment with the same excited phase.

The current is maintained through the selected motor windings until the tests shown in decision blocks 60, 64 and 66 are completed. Failure of any of the three tests shown in decision blocks 60, 64 and 66 causes the algorithm to transfer to functional block 75 in which the current through the selected motor windings is maintained. Upon successful completion of all three tests, the current is removed from the selected motor windings and the EPS system 50 is returned to normal operation in functional block 70.

Figure 6:
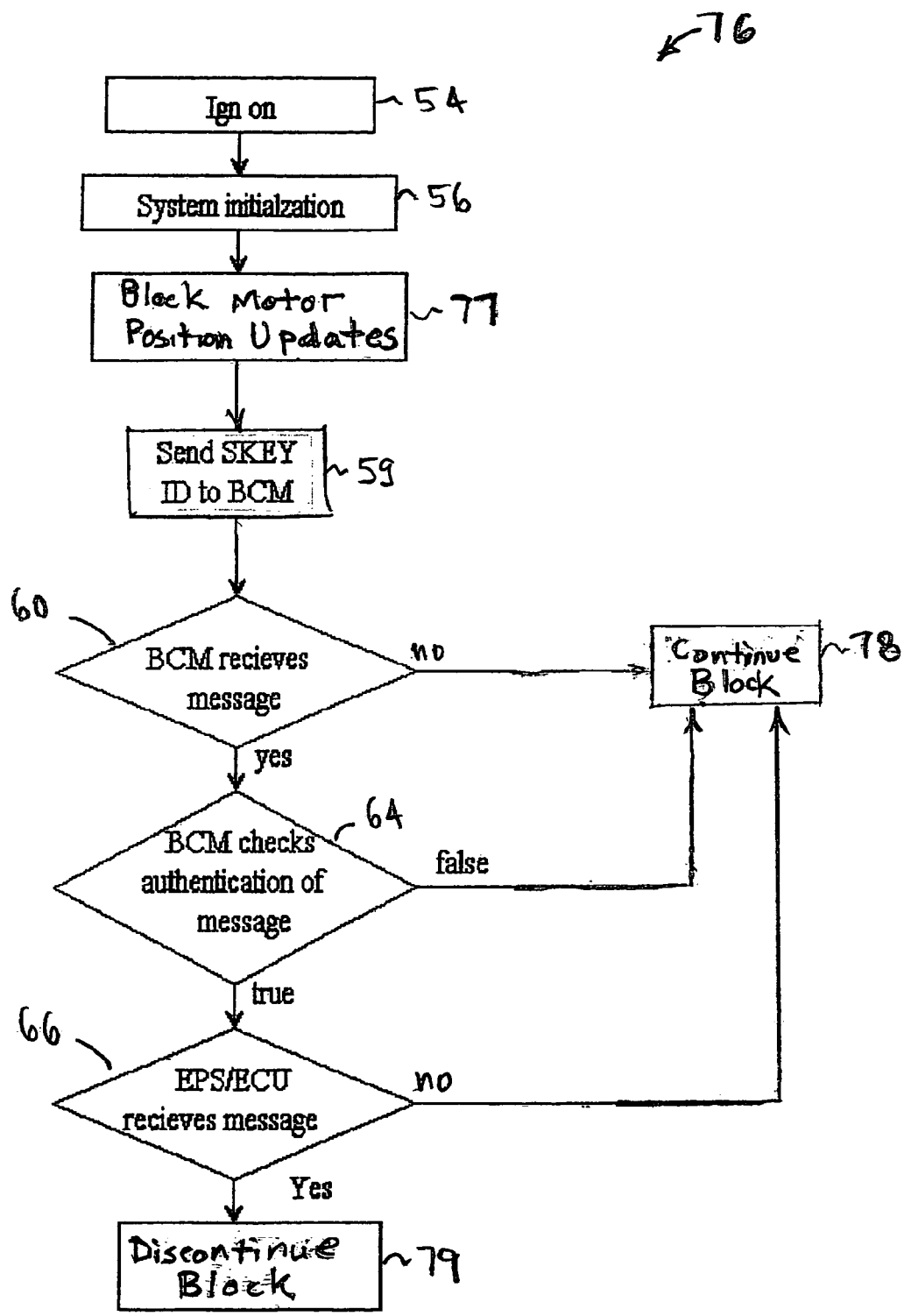
FIG. 6 is a flow chart for another alternate embodiment for operation of the EPS system shown in FIG. 3.

The preferred embodiment of the algorithm is illustrated by the flow chart 76 in FIG. 6. As above, flow chart blocks shown in FIG. 6 that are the same as blocks in FIG. 4 have the same numerical identifiers. Again, the primary difference between FIGS. 4 and 6 is the method utilized to inhibit the EPS system 50.

During normal operation, the output of the torque sensor 16 is periodically sampled. As described above, the series of sampled output values from the motor rotor position sensor 38 are used by the steering ECU 20 to determine a series of steering command signals that are utilized by the motor drive circuit 40 to energize the assist motor 36. While steering ECU 20 also uses other data, such as steering torque, vehicle speed and temperature to determine the steering command signals, the EPS system 50 can be inhibited after initialization by preventing updating of the motor rotor position or by blocking the motor rotor position signals supplied to motor drive circuit 40. Accordingly, following system initialization in functional block 56, the motor position updates are blocked in functional block 77. The blocking of the signals can be implemented by any conventional method, such as setting a flag in the algorithm or opening an electronic switch (not shown) to interrupt the transmission of the signals to the ECU 20. Once the motor position signals are blocked, the steering ECU 20 is prevented from generating new steering command signals. As a result, the steering command signals are provided to the motor drive circuit 40 in a manner that prevents rotation of the assist motor 30. Without updated steering command signals, the last set of motor drive circuit electronic switches to be placed in their conducting states remain in their conducting states, effectively locking the motor rotor in its current position. This not only holds the steerable wheels 34 in their present position, but also causes the motor to generate a counter-torque to oppose any torque applied to the steering wheel 12. Additionally, current is only supplied to the EPS system 10 when the a torque is applied to the steering wheel 12, reducing heating of the electronic components included in the EPS system 10.

The motor position signals remain blocked, preventing updating of the steering command signals in functional block 78 until the three tests shown in decision blocks 60, 64 and 66 are completed. If any of the three tests are not successfully completed, the motor position signals remain blocked in functional block 78. Only upon successful completion of all three tests is the motor position signals remain unblocked in functional block 79 and the EPS system 50 is returned to normal operation in functional block 70.

Figure 7:
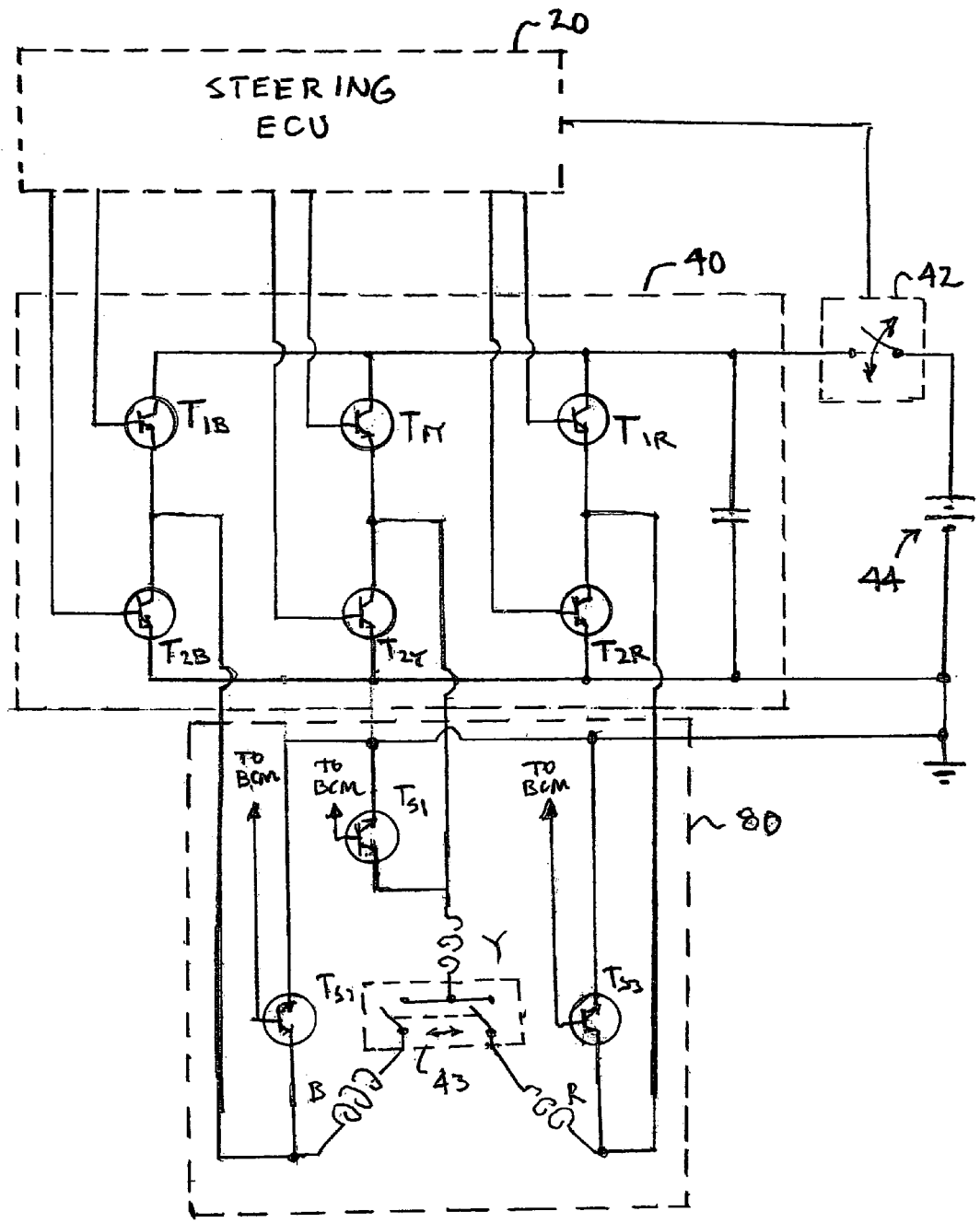
FIG. 7 is an alternate embodiment of the motor drive circuit shown in FIG. 2 that includes the present invention.

While the preferred embodiment of the invention has illustrated and described above as a modification of the EPS system algorithm, it will be appreciated that the invention also may be practiced by a modification of the EPS motor 36 to add electronic switches. For example, the embodiment described with the flow chart shown FIG. 4 can be implemented with the electric assist motor 80 shown in FIG. 7. Components shown in FIG. 7 that are similar to components shown in FIG. 2 have the same numerical identifiers. The assist motor 80 is a multiphase brushless star connected permanent magnet motor that has three electronic winding switches $T_{S1}$, $T_{S2}$ and $T_{S3}$ connected between each of the motor windings B, Y and R and ground. While bipolar transistors are shown in FIG. 7 for the winding switches $T_{S1}$, $T_{S2}$ and $T_{S3}$, it will be appreciated that other devices, such as, for example FET's, also can be utilized for the switches. The winding switches $T_{S1}$, $T_{S2}$ and $T_{S3}$ have bases connected to the body control module 24. It is contemplated that the winding switches $T_{S1}$, $T_{S2}$ and $T_{S3}$ are located on the motor leadframe (not shown). Thus, the embodiment shown can be implemented by simply changing the assist motor and providing an electrical connection from the bases of the winding switches to the body control module 24. No change is necessary in the motor drive circuit 40.

Following system initialization of the EPS system, the body control module 24 will cause the winding switches $T_{S1}$, $T_{S2}$ and $T_{S3}$ to be in their conducting state. Accordingly, the first ends of the motor windings B, Y and R are connected to ground, as described above, impeding movement of the steering rack 32 from its current position. The ground connections are maintained until all three security tests are successfully completed, at which time the winding switches $T_{S1}$, $T_{S2}$ and $T_{S3}$ are returned to their nonconducting state. If the security tests are not successfully completed, the winding switches $T_{S1}$, $T_{S2}$ and $T_{S3}$ are maintained in their conducting state, disabling the EPS system 10.

Figure 8:
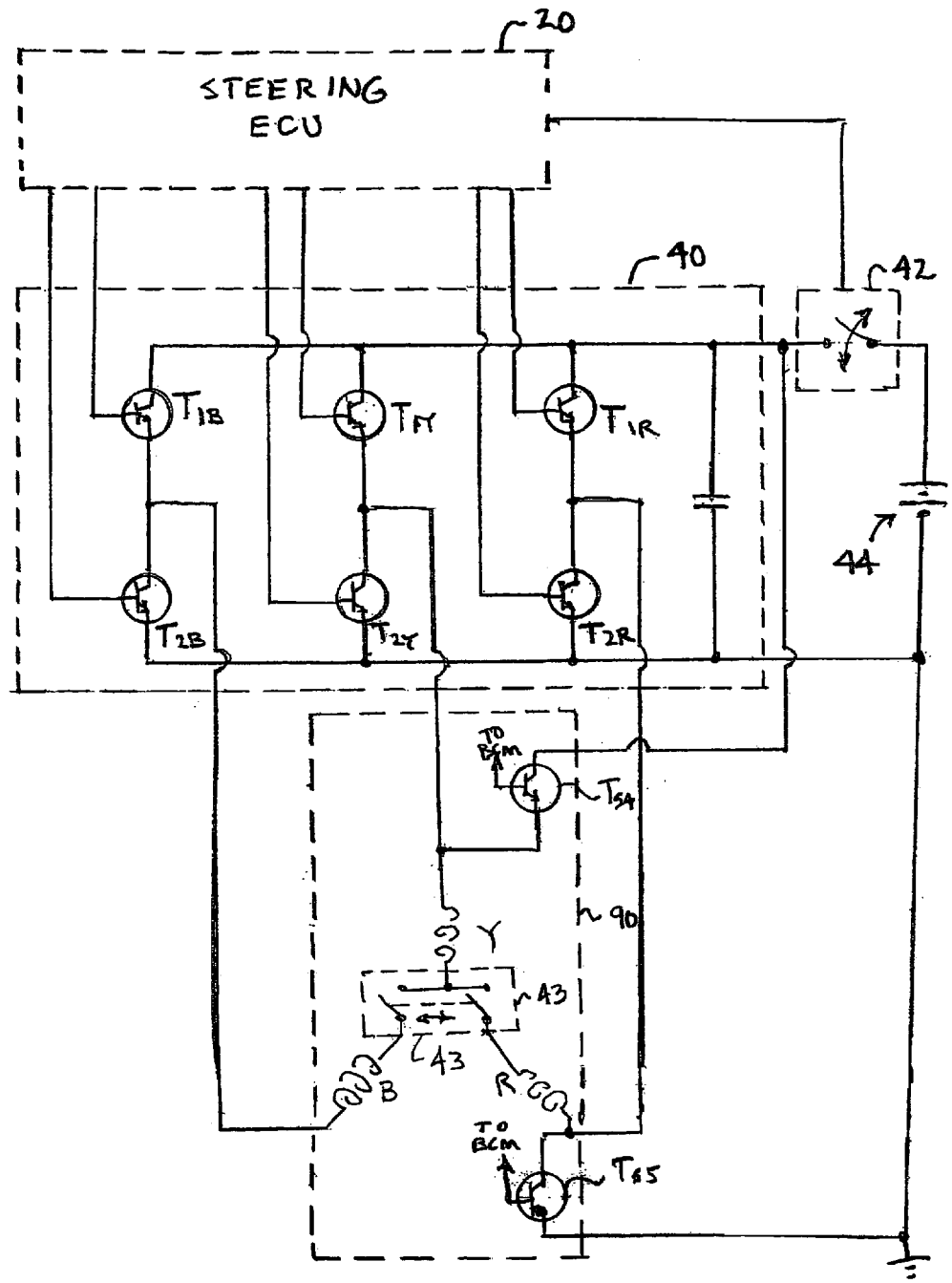
FIG. 8 is another alternate embodiment of the motor drive circuit shown in FIG. 2 that includes the present invention.

An alternate embodiment 90 of the motor is shown in FIG. 8 and provides a hardware method of implementing the embodiment shown in the flow chart in FIG. 5. As before, components shown in FIG. 8 that are similar to components shown in FIG. 2 have the same numerical identifiers. The motor embodiment 90 includes a pair of electronic switches $T_{S4}$ and $T_{S5}$ that are mounted upon the motor lead frame (not shown). While bipolar transistors are shown in FIG. 8 for the winding switches $T_{S4}$ and $T_{S5}$, it will be appreciated that other devices, such as, for example FET's, also can be utilized for the switches. Again, the embodiment shown can be implemented by simply changing the assist motor and providing an electrical connection from the bases of the electronic switches $T_{S4}$ and $T_{S5}$ to the body control module 24. No change is necessary in the motor drive circuit 40.

The first electronic switch $T_{S4}$ is connected between the first end of one of the motor windings Y and the output terminal of the power supply relay 42. The second electronic switch $T_{S5}$ is connected between the first end of another one of the motor windings R and ground. While two specific motor windings, R and Y are shown, it will be appreciated that any two windings can be selected. The bases of both of the winding switches $T_{S4}$ and $T_{S5}$ are connected to the body control module 24.

Following system initialization of the EPS system, the body control module 24 will cause the winding switches $T_{S4}$ and $T_{S5}$ to be in their conducting state. Accordingly, the motor windings Y and R are excited by a maximum winding current, as described above, locking the motor rotor and thereby the steering rack 32 in its current position. The winding current is maintained until all three security teats are successfully completed, at which time the winding switches $T_{S4}$ and $T_{S5}$ are returned to their nonconducting state. If any of the three security tests are not successfully completed, the winding switches $T_{S4}$ and $T_{S5}$ are maintained in their conducting state, disabling the EPS system 10.

Figure 2:
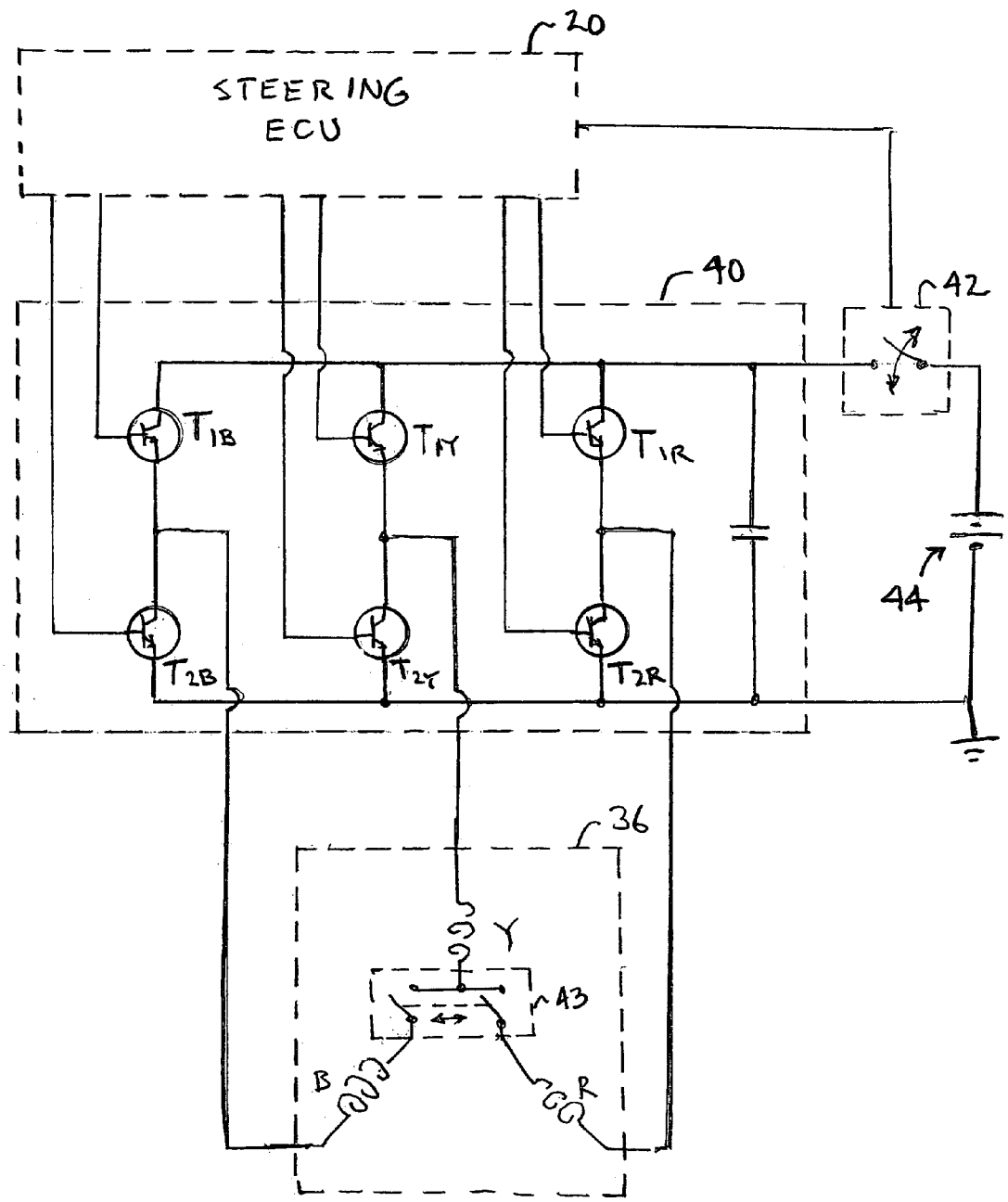
FIG. 2 is a circuit diagram of a motor drive circuit shown in FIG. 1.
Figure 9:
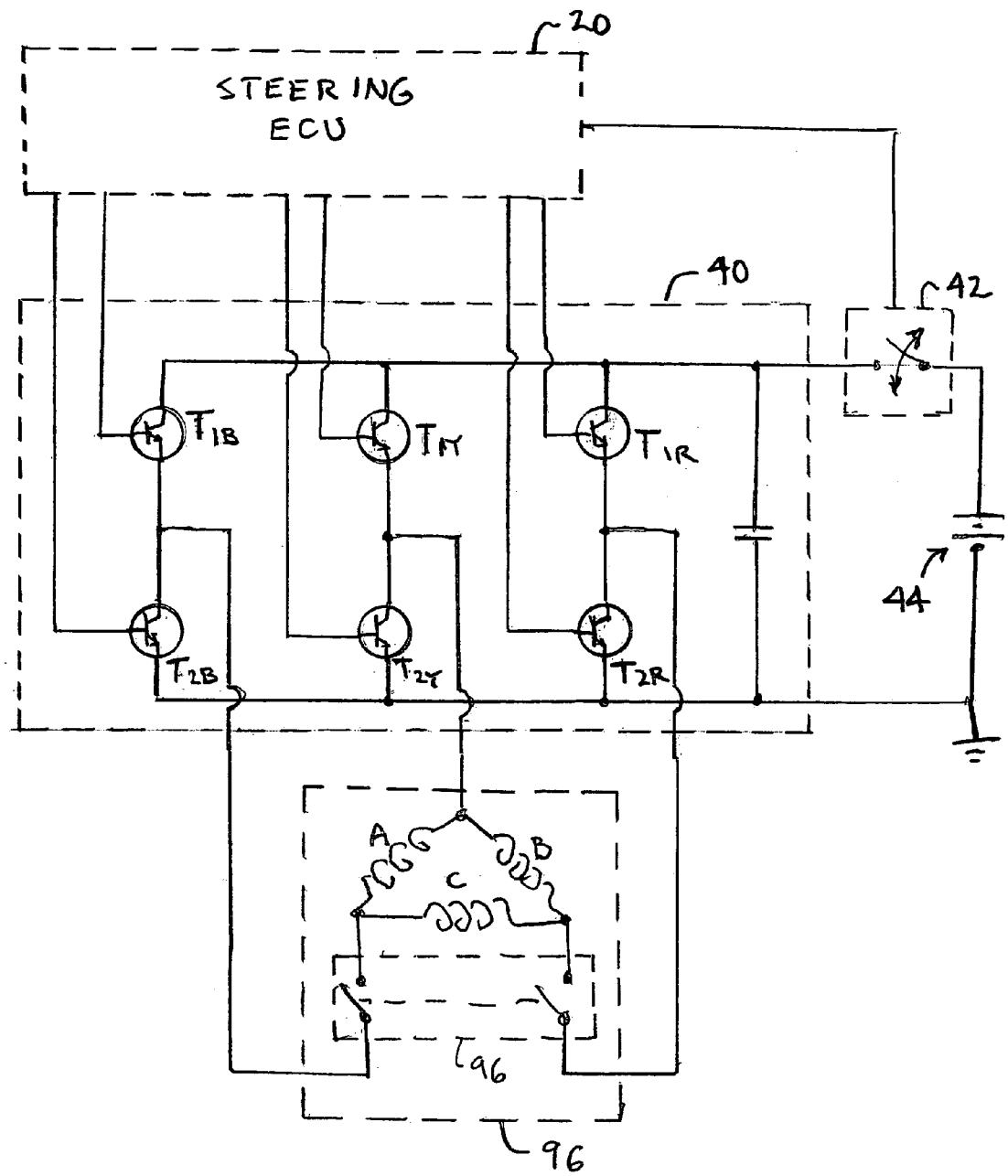
FIG. 9 is another alternate embodiment of the motor drive circuit shown in FIG. 2 that includes the present invention.

While the preferred embodiment has been illustrated and described with a permanent magnet electric assist motor, it will be appreciated that the invention also can be practiced with other types of electric assist motors, such as, for example a Permanent Magnet Alternating Current (PMAC) motor. A particular type of PMAC motor that is utilized in EPS systems has three phases. The phases may be connected in either a Y or Delta configuration. With the Y configuration, the control circuit remains as shown in FIG. 2. For a delta configuration motor 94, as illustrated in FIG. 9, the ends of the windings are connected to the common points between the electronic switches, as shown for the star configuration illustrated in FIG. 2 so that the delta connection replaces the star shown at the bottom of the figure. Components shown in FIG. 9 that are similar to components shown in the preceding drawings have the same numerical designators. Notice that the phase windings are labeled A, B and C. A winding relay 96 is included in the delta configuration shown in FIG. 9.

During operation, the motor phases are sequentially energized by the motor drive circuit to produce a desired motor torque and direction of rotation. The amount of the torque produced by a PMAC motor is a function of the amplitude of the current flowing through the phases while the direction of the torque is function of the current direction. The amplitude of the current is controlled by pulse width modulation of the applied phase voltages with the drive circuit electronic switches while the direction of the current is determined by the selection of the electronic switches. Because the motor drive circuit for a EPS system with a PMAC assist motor is the same as described above, the anti-theft feature also is included as described above.

By including an anti-theft function in the EPS system, the present invention eliminates the need for a mechanical steering column lock and the associated electrical busses. Accordingly, use of the invention reduces the complexity and cost of a vehicle.

While the preferred embodiment of the invention has been illustrated and described above with a rotor position sensor 38 mounted upon the electric assist motor 36, it will be appreciated that the rotor position data also can be obtained without a dedicated rotor position sensor. The rotor position data can be obtained directly from monitoring motor parameters. For example, the motor back emf can be sensed and utilized to calculate the rotor position. Alternately, the signature of the motor inductance, which varies with the rotor position, and can be monitored and converted to a rotor position value.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electrically assisted power steering system for a vehicle, the system comprising:
   an electric steering assist motor that is adapted to be connected to a vehicle steering system, said motor including a plurality of motor windings;
   a drive circuit electrically connected to said assist motor, said drive circuit being operative to control the direction of rotation and torque generated by said assist motor; and
   a controller electrically connected to said drive circuit, said controller being operative, upon system initialization, to cause said drive circuit to short all of said motor windings such that the operation of the vehicle steering system is inhibited, said controller being further operative, upon verification that a vehicle theft situation does not exist, to remove said motor winding shorts to cause said drive circuit to control said motor to assist in operation of the vehicle steering system.

2. The system according to claim 1 wherein said motor windings are connected in a star configuration and said drive circuit shorts said windings by connecting the non-common ends together.

3. The system according to claim 2 wherein said electric steering assist motor includes a plurality of motor windings and a plurality of electronic devices connected between each of said motor windings and circuit ground, each of said devices having a conducting and a non-conducting state and normally being in said non-conducting state, and further wherein said controller is operative, upon system initialization, to cause said electronic devices to be placed in a conducting state, whereby each of the windings are connected together.

4. The system according to claim 3 wherein said electronic devices are field effect transistors.

5. The system according to claim 1 wherein said electric steering assist motor includes a plurality of motor windings connected in a star configuration and said motor drive circuit includes a pair of electronic devices corresponding to each of said motor windings, each of said pairs of electronic devices having a first electronic device connected between said corresponding motor winding and a power supply and a second electronic device connected between said corresponding motor winding and ground, each of said electronic devices having a conducting and a non-conducting state and normally being in said non-conducting state, and further wherein said controller is operative, upon system initialization, to cause all of said first electronic devices to be placed in a conducting state, whereby operation of said steering assist motor is inhibited.

6. The system according to claim 1 wherein said electric steering assist motor includes a plurality of motor windings connected in a star configuration and said motor drive circuit includes a pair of electronic devices corresponding to each of said motor windings, each of said pairs of electronic devices having a first electronic device connected between said corresponding motor winding and a power supply and a second electronic device connected between said corresponding motor winding and ground, each of said electronic devices having a conducting and a non-conducting state and normally being in said non-conducting state, and further wherein said controller is operative, upon system initialization, to cause all of said second electronic devices to be placed in a conducting state, whereby operation of said steering assist motor is inhibited.

7. An electrically assisted power steering system for a vehicle, the system comprising:
an electric steering assist motor that is adapted to be connected to a vehicle steering system, said motor including a plurality of motor windings selectively connected together to form phases;
a drive circuit electrically connected to said assist motor, said drive circuit being operative to control the direction of rotation and torque generated by said assist motor; and
a controller electrically connected to said drive circuit, said controller being operative, upon system initialization, to cause said drive circuit to apply a constant current to at least one of said winding phases such that the operation of the vehicle steering system is inhibited, said controller being further operative, upon verification that a vehicle theft situation does not exist, to remove said motor winding constant current to cause said drive circuit to control said motor to assist in operation of the vehicle steering system.

8. The system according to claim 7 wherein said electric steering assist motor includes a plurality of motor windings with a first electronic device connected between one of said motor windings and circuit ground and a second electronic device connected between a power supply and another one of said motor windings, each of said first and second devices having a conducting and a non-conducting state and normally being in said non-conducting state, and further wherein said controller is operative, upon system initialization, to cause said first and second electronic devices to be placed in a conducting state, whereby a current continuously passes through said windings.

9. An electrically assisted power steering system for a vehicle, the system comprising:
an electric steering assist motor that is adapted to be connected to a vehicle steering system, said motor having a plurality of motor windings which are sequentially energized to provide an assist torque to the vehicle steering system;
a drive circuit electrically connected to said assist motor, said drive circuit being responsive to a series of steering command signals to control the direction of rotation and torque generated by said assist motor; and
a controller electrically connected to said drive circuit, said controller being operative to monitor selected motor parameters that are indicative of motor rotor position and to generate said steering command signals based upon the values of said selected motor parameters, and further wherein said controller is operative, upon system initialization, to prevent updating of said motor parameter values so that the steering command signals to said drive circuit prevent and oppose motor rotation.

10. The system according to claim 9 wherein said controller is further operative, upon verification that a vehicle theft situation does not exist, to allow updating of said motor parameter values so that said steering command signals to said drive circuit cause said motor to assist in operation of the vehicle steering system.

11. An electrically assisted power steering system for a vehicle, the system comprising:
an electric steering assist motor that is adapted to be connected to a vehicle steering system, said motor including a plurality of motor windings which are sequentially energized to provide an assist torque to the vehicle steering system and a rotor having a shaft;
a rotor position sensor coupled to said motor rotor shaft, said rotor position sensor operative to generate rotor position signals;
a drive circuit electrically connected to said assist motor, said drive circuit being responsive to a series of steering command signals to control the direction of rotation and torque generated by said assist motor; and
a controller electrically connected to said drive circuit and said rotor position sensor, said controller being operative to monitor said rotor position signals generated by said rotor position sensor and to generate said steering command signals based upon said rotor position signals, and further wherein said controller is operative, upon system initialization, to prevent updating of said rotor position signals so that the steering command signals to said drive circuit prevent and oppose motor rotation.

12. The system according to claim 11 wherein said controller is further operative, upon verification that a vehicle theft situation does not exist, to allow updating of said rotor position signals so that the steering command signals to said drive circuit cause said motor to assist in operation of the vehicle steering system.

13. A method for theft protection of a vehicle having an ignition system, the method comprising the steps of:
(a) providing an electric power steering system that is electrically connected to the vehicle ignition system and includes an assist motor that is adapted to be connected to a vehicle steering system, the assist motor having a plurality of phase windings, a drive circuit electrically connected to the assist motor, the drive circuit being responsive to steering command signals to control the direction of rotation and torque generated by the assist motor and a controller electrically connected to the drive circuit, the controller being responsive to assist motor rotor position and steering torque signals to generate steering command signals;
(b) initializing the electric power steering system upon actuation of the vehicle ignition system;
(c) disabling the electric power steering system by connecting the assist motor windings together to inhibit movement of the vehicle steering system; and
(d) returning the electric power steering system to operation only upon confirming that a vehicle theft situation does not exist.

14. A method for theft protection of a vehicle having an ignition system, the method comprising the steps of:
(a) providing an electric power steering system that is electrically connected to the vehicle ignition system and includes an assist motor that is adapted to be connected to a vehicle steering system, the assist motor having a rotor and a plurality of phase windings that are selectively energized as motor, a drive circuit electrically connected to the assist motor, the drive circuit being responsive to steering command signals to control the direction of rotation and torque generated by the assist motor and a controller electrically connected to the drive circuit, the controller being responsive to assist motor rotor position and steering torque signals to generate steering command signals;
(b) initializing the electric power steering system upon actuation of the vehicle ignition system;
(c) disabling the electric power steering system by energizing at least one of the assist motor phases with a constant electric current that is sufficient to inhibit movement of the motor rotor to inhibit movement of the vehicle steering system; and (d) returning the electric power steering system to operation only upon confirming that a vehicle theft situation does not exist.

15. A method for theft protection of a vehicle having an ignition system, the method comprising the steps of:

(a) providing an electric power steering system that is electrically connected to the vehicle ignition system and includes an assist motor that is adapted to be connected to a vehicle steering system, the assist motor having a rotor and a plurality of phase windings with the phase windings being sequentially energized in response to a series of steering commands to cause the motor rotor to rotate, a drive circuit electrically connected to the assist motor, the drive circuit being responsive to steering command signals to control the direction of rotation and torque generated by the assist motor and a controller electrically connected to the drive circuit, the controller being responsive to assist motor rotor position and steering torque signals to generate steering command signals;

(b) initializing the electric power steering system upon actuation of the vehicle ignition system;

(c) disabling the electric power steering system by preventing updating of the motor rotor position signals so that the steering command signals to the drive circuit prevent and oppose motor rotation to inhibit movement of the vehicle steering system; and (d) returning the electric power steering system to operation only upon confirming that a vehicle theft situation does not exist.

16. The method according to claim 15 wherein step (b) includes utilizing a vehicle ignition key to activate the vehicle ignition system, the vehicle ignition key having an identification code stored therein and further wherein step (d) includes comparing the ignition key identification code to a stored code upon the ignition key being inserted into the ignition key lock to confirm that a vehicle theft situation does not exist.

17. The method according to claim 16 wherein the ignition key identification code must be confirmed within a first predetermined time period to confirm that a vehicle theft situation does not exist.

18. The method according to claim 17 wherein the controller must receive a signal that the correct ignition key is inserted into the ignition key lock within a second predetermined time period to confirm that a vehicle theft situation does not exist.

* * * * *